Figure 1:
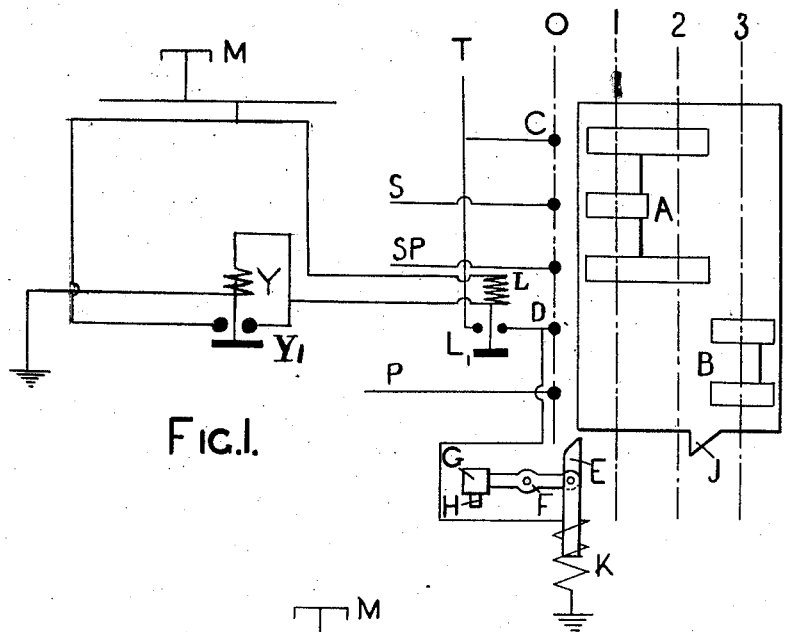

Aug. 7, 1923.

C. E. FAIRBURN

CONTROLLER FOR ELECTRIC MOTORS

Filed Sept. 22, 1920 2 Sheets-Sheet 1

INVENTOR
Charles Edward Fairburn,
by Bakewell, Byrnes Parmelee
his attys.

Aug. 7, 1923.

C. E. FAIRBURN 1,464,245

CONTROLLER FOR ELECTRIC MOTORS

Filed Sept. 22, 1920

2 Sheets-Sheet 2

Patented Aug. 7, 1923.

1,464,245

UNITED STATES PATENT OFFICE.

CHARLES EDWARD FAIRBURN, OF LONDON, ENGLAND.

CONTROLLER FOR ELECTRIC MOTORS.

Application filed September 22, 1920. Serial No. 412,098.

*To all whom it may concern:*

Be it known that I, CHARLES EDWARD FAIRBURN, a subject of the King of England, residing at London, England, have invented certain new and useful Improvements in Controllers for Electric Motors, of which the following is a specification.

This invention relates to controllers for electric motors for use in cases where motors are required to work on two or more circuits having different characteristics. Examples of these conditions are afforded by traction systems which, on different parts of the line may have supplies which differ in voltage, frequency or other characteristics. In an example afforded by direct current traction the supply may be at a relatively high voltage at some parts of the line and at a considerably reduced voltage at other points, and in order to deal with these conditions it is desirable that the motors should have different groupings in the two cases. For instance, the motors may be arranged to run four in series during starting up and may then be changed to run in two groups in parallel, each group containing two motors in series this arrangement being the normal running condition for the higher voltage. When working on the lower voltage supply a further change would be made so that all the motors are made to work in parallel.

When dealing with alternating current, traction conditions may be met with in which the supplies on different parts of the line are at different frequencies. With a three phase supply using induction motors, these may be grouped so as to run in cascade on the higher frequency and in parallel on the lower frequency.

In both the examples mentioned above the controlling arrangements for the motors must provide for at least two sets of connections corresponding to the different characteristics of the supplies at different points in the line, but in each case one of these groupings will be used during starting with both forms of supply. In accordance with the present invention this feature is taken advantage of by providing a controller having two sections, one of which is employed at each time that a start is made, while the other is brought into action when one only of the two forms of supply is in use. The change in the method of working of the controller is arranged to be automatic, the second section of the controller being rendered operative by a device arranged in circuit with the supply and adapted to differentiate in its action between the two forms of supply, so that the second section of the controller is only brought into use when the vehicle or train carrying the motors is on that part of the line which has the appropriate form of supply.

In describing the invention, the accompanying drawings will be utilized. The 3 figures show diagrammatically three arrangements of the invention as applied to direct current supplies at two different voltages which will be distinguished by being referred to as being the high tension and low tension supplies respectively. In these diagrams electro-magnetically controlled devices are shown in the positions which they occupy when the high tension supply is in use.

It will be recognized that the invention is applicable to various forms of controllers whether of the direct acting or of the automatic or manually controlled multiple unit type. The common form of drum type controller serving either as the main controller or as a master controller is readily adapted in accordance with this invention. In the example illustrated by the drawings the case of a drum type controller has been selected in which this is the master controller of an automatic multiple unit system. By this choice the invention can be illustrated by diagrams which are not complicated by a large number of connections which are not directly part of the subject matter of the invention.

In the diagrams the controller barrel is indicated as a developed cylindrical surface with the contact strips mounted thereon. The controller provides an off position and three operative positions which are indicated in the usual manner by the lines marked 0, 1, 2, 3. The controller deals with a unit consisting of four motors which in position 1 are all connected in series, in position 2 are arranged in two parallel groups each comprising two motors in series, and in position 3 are arranged all four in parallel. The control current is led into this master controller by the wire T and passed by way of the wire S to operate the means for bringing about the series connection and by way of the wire SP to the means for bringing about the series parallel connection.

The wire P is provided for carrying the current to the means for bringing about the parallel arrangement of the motors. Only positions 1 and 2 of the controller are intended to be operative when the high tension supply is in use, and in accordance with this invention arrangements are provided to prevent the third position from becoming effective except when the low tension supply is in use. The method of bringing about this result is the separation of the contacts on the drum into two sets A and B and the provision of two independent fingers C and D for rendering these two sets of contacts alive. The change over of the controller can then be brought about by means of an electro-magnetically operated switch $L_1$ in the circuit connected with the finger D.

Instead of or in addition to the method of controlling the second set of contacts just described, a stop device may be provided in such a form as to limit the movement of the drum so that normally only the contacts A can be moved far enough to cooperate with the fingers. This stop can then be controlled by the differentiating device so as to be taken out of action when the low tension supply is in use. An arrangement of this kind is indicated in the drawings in which a stop E is pivoted at F and provided with a counter weight G normally resting on a stop H in which position the stop E projects into the path of a lug J, on the controller drum so located, that unless it can pass the stop E the contacts B cannot come into engagement with the controller fingers. This stop E is arranged to be controlled by the solenoid K so as to be drawn out of its normal position when the solenoid K is energized, which, in the arrangement illustrated, will take place when the switch $L_1$ is closed. A stop device of this kind is preferably so arranged that it will not prevent the movement of the controller towards the off position and is effective only during the opposite movement. This is required to take care of the conditions which arise when the second section of the controller is in use at the time when the change over from one form of supply to the other takes place. At this point of change there will generally be provided a dead section in the conductor from which the current is collected. When the collector comes on this dead section the no-volt release comes into action breaking the circuit and necessitating the return of the controller handle to the "off" position before the circuit can be re-made.

In another form of differentiating device particularly suitable for use with drum type controllers the set of contacts forming the second section of the drum is mounted on a portion of the drum which is adapted to be mechanically uncoupled from the rest of the drum. The differentiating device then governs the connection or disconnection of this part so that when it is not required to come into action it is maintained in an inoperative position and does not share in the movement of the rest of the drum.

The differentiating device may be, in a simple form, a coil of a solenoid or electromagnet operating a switch, stop, clutch, or a combination of two or more of these or some other device adapted to bring the second section of the controller into and out of action as required. This coil can have a resistance or impedance such that the strength of current flowing through it will be materially different under the two sets of conditions between which the coil has to distinguish in its action, so that the strength of attraction exerted by the coil on its armature will differentiate between the two cases. Instead of a single coil it is generally preferable to provide two coils and to arrange these coils in series, one coil being adapted to be operative with one form of supply and the other with the other form of supply only. An arrangement of this kind is indicated in Figure 1 where two coils L and Y are connected in series between the collector M and earth. The coil L is arranged so as to operate the switch $L_1$ and is so designed that it is effective when the collector M is on the low tension conductor. Under these conditions the coil Y does not take sufficient current to be effective but when the collector M comes on to the high tension conductor the coil Y comes into action and closes the switch $Y_1$, which short circuits the coil L and accordingly opens the switch $L_1$. With such an arrangement greater security of action is obtained than when a single coil is employed since, if the circuit containing the two coils should be broken, the device for rendering the second section of the controller effective will not fail to be put out of action. The same result can be secured in case an earth on the circuit containing the coils L and Y occurs, by inserting a fuse in the circuit.

Figure 2:
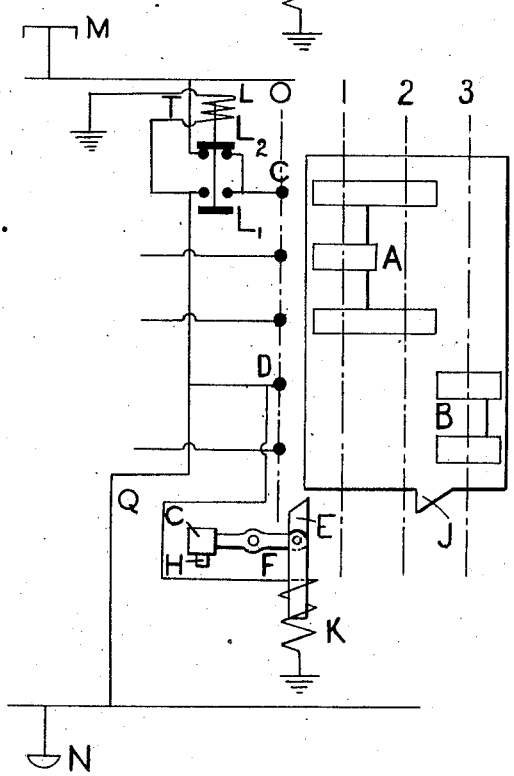

In some instances the two forms of supply will be connected with differently disposed conductors so that the methods of collecting current for the vehicle or train will be different in the two cases. For example a high voltage supply would use overhead conductors while a third rail might be employed at those parts of the line where a lower voltage is used. In such cases the differentiating action may be very simply obtained by connecting the first section of the controller with both collectors and the second section of the controller with one collector only, so that the second section of the controller can only become effective when current is being taken from the appropriate form of supply. An arrangement of this kind is illustrated in Figure 2 which, as regards the form of the controller, for the sake of simplicity has been made identical with the arrangement shown in Figure 1 although the method of direct connection of the two supplies to the controller is more particularly applicable to a direct acting controller rather than a master controller. The method of applying the invention, however, is not affected by these considerations.

In this arrangement the electro-magnetic switch controlled by the coil L has two contact members $L_1$ and $L_2$ the latter of which is brought into action by a weight or spring when the coil L is dead, that is to say, when the collector M, (which is taken to be a bow collector working in conjunction with an overhead wire) is supplying current. Under these conditions the finger D is not in connection with the supply so that the section B of the contacts does not become operative and the stop B is held in position to engage the lug J. When the collector N (assumed to be a shoe engaging a third rail) receives a supply of current the coil L is energized and the circuit from the wire T to the finger C is broken by contact $L_2$, while the circuit from the wire Q to the finger C is made by the contact $L_1$. At the same time, the finger D is rendered alive and the stop E is pulled down out of action.

Figure 3:
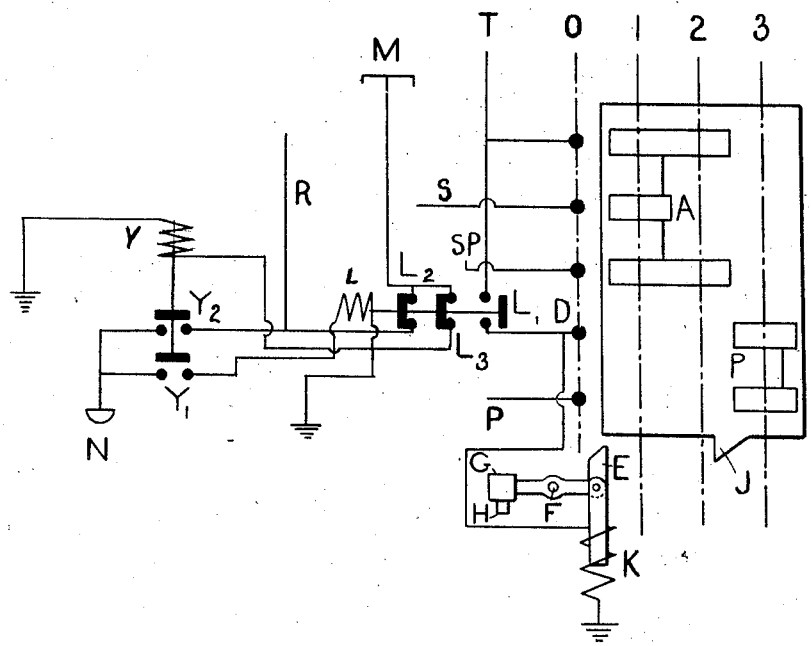

In Figure 3 is illustrated an alternative arrangement applicable to conditions where the high tension supply is by way of an overhead conductor and the low tension supply by way of the third rail. This alternative arrangement as illustrated is applicable to the case where a master controller is employed which is not directly supplied with current from either of the collectors. The arrangement is an example of the provision of two coils for differentiating the action of the controller in regard to the two sources of supply. These coils are also arranged to govern the connections between the collectors and the motor circuits. This provides that one set of collectors is rendered dead when the other set of collectors is in use.

In Figure 3 the coil Y which is energized by the high tension supply, controls the switch having two contact members $Y_1$ and $Y_2$ arranged to control the low tension circuits and to maintain open contact at both places when the collector M is on a live part of the overhead line. The switch controlled by the coil L has three contact members $L_1$ $L_2$ and $L_3$, the first of which controls the supply current to the finger D and the coil K as in Figure 1. The contact $L_2$ controls the connection between the collector M and the motor circuits by way of the wire R. The contact $L_3$ controls the circuits containing the coil Y. $L_1$ is open and $L_2$ and $L_3$ are closed when the coil L is out of action. The contacts Nos. $Y_1$ and $Y_2$ are in their closing positions when the coil Y is out of action.

What I claim as my invention and desire to secure by Letters Patent is:—

1. A controlling arrangement for electric motors adapted to work on circuits having different characteristics, comprising a controller having a plurality of sections, means for bringing these sections into action in sequence, a device acting on the controller and controlling the passing from the activity of one section to that of the next, said device comprising an electromagnetic switch determining the passage of current to the latter section of the controller and means for connecting said electromagnetic switch with the supply system.

2. A controlling arrangement for electric motors adapted to work on circuits having different characteristics, comprising a controller having a plurality of sections, means for bringing these sections into action in sequence, a device acting on the controller and controlling the passing from the activity of one section to that of the next, said device comprising an electro-magnetic switch determining the passage of current to the latter section of the controller and electro-magnetically operated means for controlling the movement of the said section into the operative position, and means for connecting said electro-magnetic switch and said electromagnetically operated means with the supply system, substantially as described.

3. A controlling arrangement for electric motors adapted to work on circuits having different characteristics, comprising a controller having a plurality of sections, means for bringing these sections into action in sequence, an automatic electric device acting on the controller and controlling the passing from the activity of one section to that of the next, means connecting said device with the supply system, said device comprising two coils arranged in series, one coil being so designed that it is effective when connected with one form of supply while the other is so designed that it is effective only when connected with another form of supply, and a switch operated by said second coil and arranged to short circuit the first coil, substantially as described.

In testimony whereof I affix my signature.

CHARLES EDWARD FAIRBURN.